March 16, 1954     W. BRIGHT     2,671,928
PIVOTED MOUNTING AND SUPPORT FOR CLOSURES
Filed March 2, 1949     3 Sheets-Sheet 1
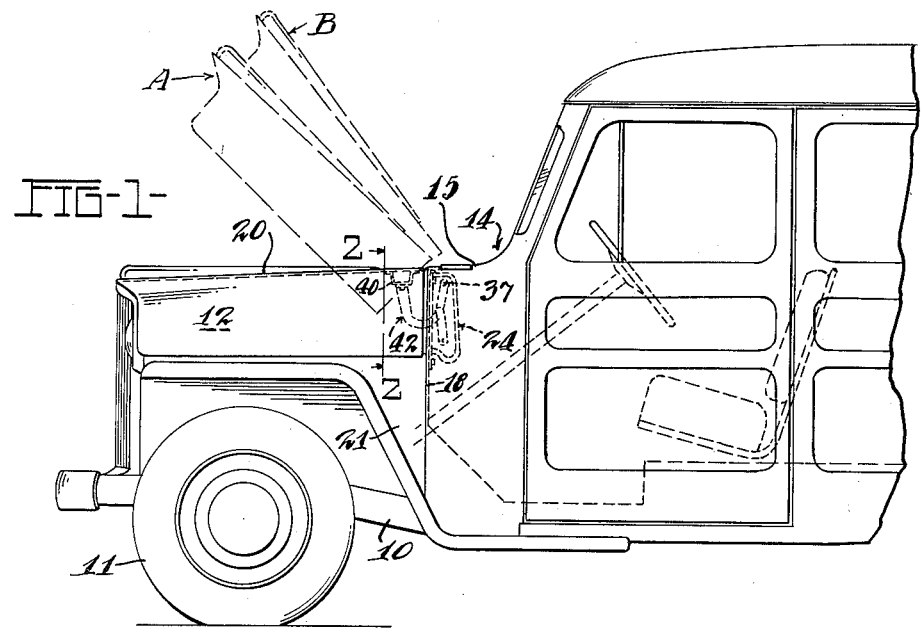
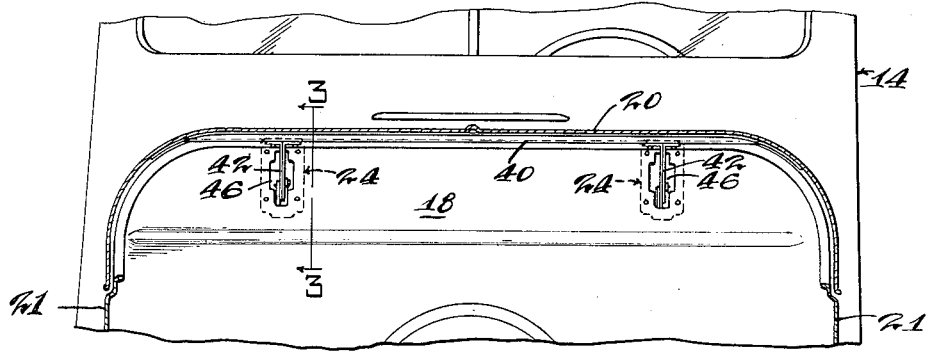
INVENTOR.
Wilfred Bright
BY
Harry O. Ernsberger
ATTY.

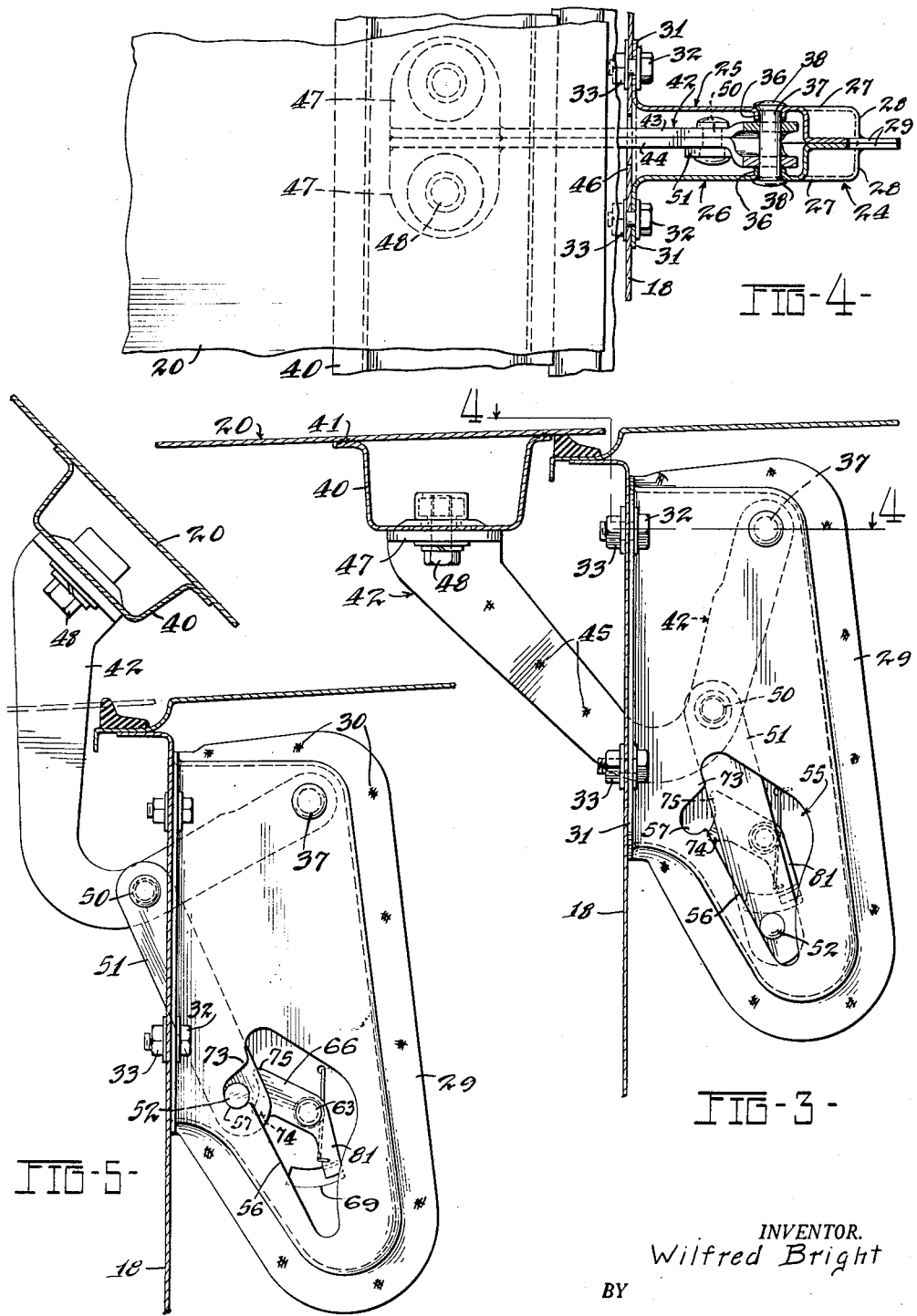

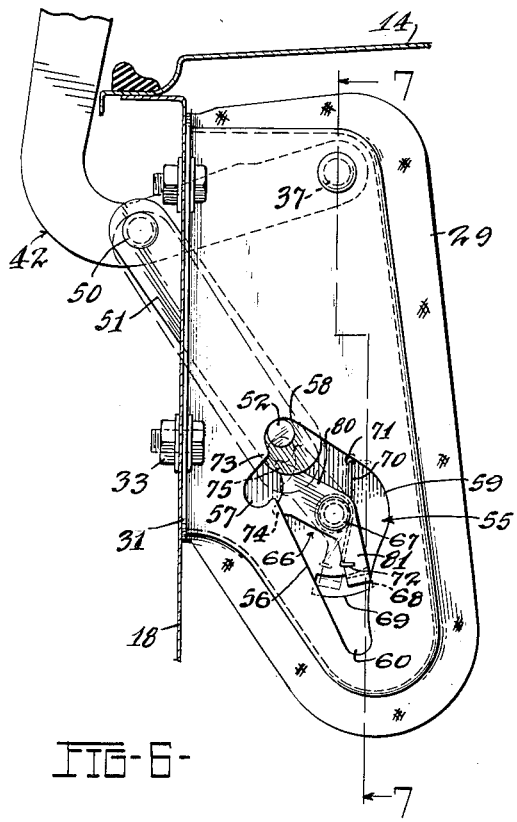
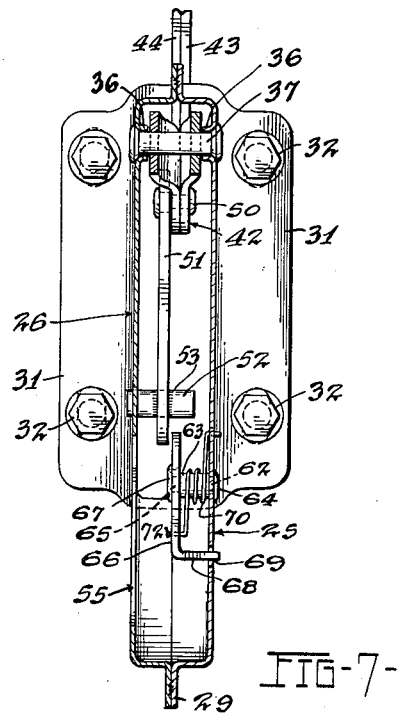
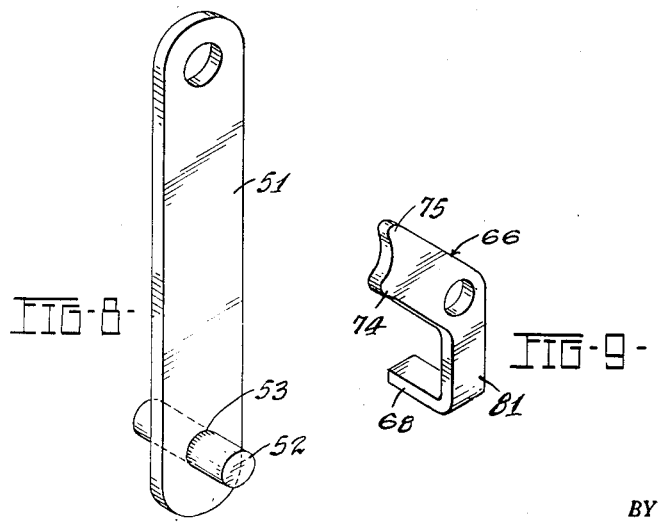

Patented Mar. 16, 1954

2,671,928

UNITED STATES PATENT OFFICE 2,671,928

PIVOTED MOUNTING AND SUPPORT FOR CLOSURES

Wilfred Bright, Toledo, Ohio, assignor, by mesne assignments, to Willys Motors, Inc., Toledo, Ohio, a corporation of Pennsylvania Application March 2, 1949, Serial No. 79,217

3 Claims. (Cl. 16—138)

This invention relates to a mounting and support for liftable hinged closures and more especially to supports for automobile hoods, vehicle luggage compartment covers and other installations of hinged lids or closures.

The invention more especially pertains to a supporting means for a hingedly mounted hood or cover for a vehicle engine compartment of a type wherein the hood or closure is arranged to be supported in an elevated or open position and which may be released by movement of the closure relative to its support.

An object of the invention is the provision of a supporting means for liftable hinged closures wherein a simple and effective means is provided for the purpose and wherein the thrust of supporting the closure is borne directly by a relatively immovable member.

Another object of the invention resides in the provision of a supporting means for a hinged closure for maintaining the latter in elevated position, the arrangement embodying means for preventing accidental release of the support and which is releasable only upon further elevational movement of the closure.

A further object of the invention is the provision of a supporting means for retaining a hinged closure in elevated or raised position wherein a movable pawl or trigger member serves to guide or direct a closure supporting bar or strut into closure elevating position and which is arranged and disposed to prevent the closure from being moved to closed position until the supporting means has come to rest in closure elevating and supporting position.

Another object of the invention resides in a simple and compact means for supporting a hinged closure in open position wherein a movable pawl is arranged to automatically direct a supporting element to closure-supporting position and for permitting release of the closure from elevated position arranged to function upon further upward movement of the closure from its normal open position.

Still a further object of the invention is the provision of spaced supporting units mounted upon the dashboard of a vehicle and arranged to support the hood in open position, the units embodying comparatively short bars or struts as hood supporting members which occupy comparatively small space and present no interference with other accessories and equipment.

Another object of the invention resides in the provision of a unit upon which an automobile engine compartment hood is hingedly mounted and adapted to be held in open position wherein the hood supporting unit is disposed rearwardly of the dashboard in the engine compartment.

Another object of the invention resides in the provision of means for hingedly mounting and supporting an automobile hood comprising a minimum number of elements which are reliable in operation and which may be produced in mass quantities at a low cost.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of the forward portion of an automotive vehicle embodying a form of my invention;

Figure 2 is a transverse sectional view through the vehicle engine compartment showing the hood mounting and supporting means;

Figure 3 is a fragmentary sectional view taken substantially on the line 3—3 of Figure 2;

Figure 4 is a sectional view taken substantially on the line 4—4 of Figure 3;

Figure 5 is a view similar to Figure 3 showing the hood or closure in raised or elevated position;

Figure 6 is a view similar to Figure 5 showing the elements of the hood supporting means in releasing position;

Figure 7 is a vertical sectional view taken substantially on the line 7—7 of Figure 6;

Figure 8 is an isometric view of one of the hood supporting bars or struts, and

Figure 9 is an isometric view of a pawl element forming a part of the invention.

While I have illustrated a form of my invention as utilized in hingedly mounting and supporting a hood or closure for an automotive vehicle engine compartment, it is to be understood that I contemplate the use of my invention with other types of hingedly supporting members.

Referring to the drawings in detail and first with particular reference to Figure 1, there is illustrated the forward portion of an automotive vehicle which is inclusive of a chassis frame 10, front wheels 11, an engine compartment 12 and a vehicle body 14 having a cowl portion 15. The engine compartment 12 is separated from the interior of the vehicle body by means of a dash board or panel 18.

As shown in the drawings, the engine compartment is covered or closed by means of a hood or lid 20 hingedly mounted in a manner hereafter explained and which cooperates with side panels 21 forming part of the engine compartment. The movable hood 20 is hingedly supported adjacent to the dash board 18 so that the hood may be raised or elevated to the dotted position shown at A in Figure 1.

The present invention pertains to a means for hingedly mounting the closure 20 so that it may be readily moved to and supported in its open or raised position as indicated in broken lines at A in Figure 1 and which may be released by further slight upward movement of the closure, the additional movement automatically effecting a disengagement of the means for holding the hood in elevated position so that the same may be returned to closed position. The arrangement for accomplishing these purposes is inclusive of spaced means or units for hingedly mounting the hood 20 and are indicated at 24 in Figures 1 and 2. As the assemblies or units 24 are of identical construction a description of one will suffice. Each unit 24 includes a bracket construction preferably formed of sheet metal and is made in two halves or sections 25 and 26 of identical formation. Each of the metal sections 25 and 26 is formed with a wall portion 27 and inwardly extending portions 28 which terminate in flanges 29 arranged in abutting relationship as particularly shown in Figure 4, the flanges being welded or otherwise secured together as indicated at 30. The wall portions 27 are in substantially parallel relation and are formed at their forward ends with laterally extending flanges 31 arranged to abut against the dash board 18. The flanges 31 are fixedly secured to the dash board by means of bolts 32 passing through aligned openings in the flanges and dash board, the bolts accommodating securing nuts 33.

The wall portions 27 of the bracket sections 25 and 26 are formed with aligned flanged circular openings 36 to receive a pin or rod 37 which is secured in assembled relation with the brackets 25 and 26 by swaged end portions 38. The pin 37 provides a pivotal support or pintle about which hood 20 is adapted to swing. The hood 20 is formed with a laterally extending channel-shaped member 40 which is welded as at 41 to the hood and to which is secured a pair of spaced bracket assemblies or units 42. Each bracket assembly comprises coextensively arranged L-shaped members 43 and 44 which are spot welded together as indicated at 45. The bracket sections 43 and 44 extend through openings 46 in the dash board 18 and ends of the bracket sections adjacent the pin 37 are spaced apart as indicated in Figure 4, the spaced portions having aligned openings through which the pin 37 extends. The other ends of the bracket sections 43 and 44 are bent outwardly to form flanges 47 which are secured to the channel member 40 by means of securing bolts 48. The brackets 42, pins 37 and supports 25 and 26 provide a means for hingedly mounting the hood 20 so that the latter may be swung to an elevated position as indicated at A in Figure 1 about the axis of the pin 37.

Each bracket 42 is provided with a stub shaft or pin 50 spaced from the shaft 37, the upper end of a bar or strut 51 being pivotally connected to bracket 42 through the medium of the shaft 50. The other end portion of the bar 51 is provided with an opening adapted to receive a pin 52 formed with a serrated portion 53 for rigidly affixing the pin in the bar. The wall portion 27 of the sheet metal section 26 is cut away or slotted as at 55, the pin 52 extending into the slot 55. The slot 55 is bounded by a uniplaner wall 56, a socket or keeper portion 57, an upper wall 58, an arcuate portion 59 and a lower socket portion 60. The pin 52 is arranged for transverse in the slot 55 during relative movement of the closure 20 in a manner and for purposes to be hereinafter explained.

The side wall portion 27 of sheet metal section 25 is formed with an opening to snugly receive a tenon 62 of a member or shaft 63, the end of the tenon 62 being swaged as at 64 to rigidly secure the member 63 to the sheet metal section. The other end of member 63 is formed with a tenon 65 upon which is pivotaly mounted a pawl or trigger member 66. The end of the shaft 63 adjacent the tenon 65 is swaged as at 67 to maintain the pawl 66 in asembled relation with member 63. The pawl 66 is provided with a lateral extension 68 which projects into a slot 69 formed in the side wall of the sheet metal section 25 the ends of the slot serving to cooperate with the projection 68 to limit the pivotal movement of pawl 66. A coil spring 70, having one end anchored as at 71 in an opening in the wall of section 25 and the other end 72 engaging the pawl 66, serves to resiliently urge the pawl in a counter-clockwise direction as viewed in Figure 6. The trigged member or pawl 66 is formed with projections 74 and 75 which are arranged for cooperation with the pin 52 during opening, releasing and closing movements of the hood 20.

The operation of the hood supporting means of the present invention is as follows: When the hood is in closed position as shown in Figure 3, the pin 52 carried by the pivotally suspended bar 51 rests against the uniplanar wall 56 of the slot 55 as shown in Figure 3. The bar or link 51 tends to swing in a clockwise direction under the influence of gravity resulting from the angular position of the link as shown in Figure 3 to maintain the pin 52 in engagement with the wall 56. When the hood or closure 20 is elevated toward the position shown at A in Figure 1 and illustrated in Figure 5, the upward swinging movement of the hood 20 and brackets 42 about the axis of the hinge pin 37 moves the link 51 and pin 52 upwardly, the pin remaining in contact with the wall 56. As the hood 20 approaches its elevated position the pin 52 contacts projection 74 formed on the pawl 66 swinging the latter in a clockwise direction as viewed in Figure 5. The pawl swings an amount sufficient to permit the passage of pin 52 past the projection 74 after which the pin 52 falls into the socket or keeper 57 under the influence of gravity, this position of the parts being shown in Figure 5. One of the features of the instant invention is the prevention of movement of hood 20 to a hood releasing position until after the pin 52 has engaged in the keeper 57. This is accomplished through the medium of the trigger or pawl 66 as the latter during elevational movement of hood 20 cannot be moved upwardly beyond the dotted position as shown in Figure 6. When the pawl 66 has been swung to the position to permit the pin 52 to pass the projection 74, the throat or space provided between projection 74 and a lobe 73 formed in the wall contour of the slot 55 is insufficient to permit the passage of pin 52 above the trigger member 66 without first permitting the trigger member to return to its normal position as shown in Figure 5.

The hood 20, in elevated position as indicated at A in Figure 1 and in Figure 5 will remain in such position retained by engagement of the pin 52 in the keeper 57, the thrust of supporting the hood 20 being taken directly upon the mounting brackets 24 through the medium of the struts 51. In this manner no part of the stress of supporting the hood 20 in elevated position is transmitted to the trigger member 66.

When it is desired to effect a release of the hood 20, the operator simply elevates the hood through a further opening movement to the position indicated at B in Figure 1, the parts assuming the position shown in Figure 6. During this additional elevational movement of the hood 20, the pin 52 is moved further upwardly by upward movement of the link 51, which movement engages the pin with the uppermost projection 75 on the pawl 66 causing the latter to be again swung in a clockwise direction until the pin 52 passes through the throat or space existent between projection 75 and the lobe 73 formed in the wall of the slot 55. Immediately after the pin 52 passes through this space reaching the position illustrated in Figure 6, the trigger member or pawl 66 is swung to its initial position as shown in full lines in Figure 6 under the influence of the spring 70. As the operator then lowers the hood, the pin 52 engages an upper wall 80 of the trigger member 66 and is guided thereby and by the arcuate wall 59 of the slot 55 to return to its initial position as shown in Figure 3. During the return movement of pin 52 to its initial position it engages the downwardly extending portion 81 of the pawl 66 causing the pawl to be again swung in a clockwise position to permit the passage of the pin 52.

It should be noted that in the operation of elevating and releasing the hood or closure 20, the weight of the hood is not communicated to the trigger member 66, the latter functioning to properly direct or guide the pin 52 into the keeper 57 and, during releasing movement of the hood or closure 20, to direct or guide the pin so that it returns in the proper path to its initial position in which the hood 20 is closed. The arrangement of my invention as above described is simple and effective and reliable in its operation and furthermore the operative elements of the arrangement are substantially contained in the operator's compartment of the vehicle to the rear of the dash board providing more usable space in the engine compartment.

It is apparent that, within the scope of the invention, modifications and different arrangements may be made other than is herein disclosed, and the present disclosure is illustrative merely, the invention comprehending all variations thereof.

What I claim is:

1. Mounting and supporting means for a relatively movable hood for a vehicle engine compartment having a dash board including, in combination; a sheet metal support adapted to be mounted upon the dash board; a bracket adapted to be carried by the hood and pivotally connected to said support; a strut pivotally connected to said bracket; a pin carried by said strut; a closed slot configuration formed in a wall of said support; said slot configuration including a socket adapted to receive said pin for supporting the hood in elevated position; a pawl pivotally mounted upon said support; said pawl being configurated with a projecting portion adapted to interrupt movement of said pin to direct the same into said socket upon elevated movement of the hood; said pawl being configurated with a downwardly projecting portion adapted to engage a wall of the slot to limit movement of said pin until the same has engaged in the said socket; said pawl being shaped with an upwardly extending projection so that further elevated movement of the hood causes upward movement of the pin away from the socket and past the upwardly extending projection, and spring means for biasing the pawl in a direction whereby the pawl guides the pin to its initial position when the hood is moved to closed position.

2. A mounting and supporting device for a relatively movable closure including, in combination, a relatively stationary supporting bracket, said closure being pivotally supported upon the bracket, said supporting bracket being formed with a closed slot having front and rear walls, a closure supporting bar connected with said closure, a pin carried by said supporting bar arranged for traverse in said slot, a pawl pivotally mounted on said bracket and arranged to be engaged by said pin during opening and closing movements of said closure, said slot having said front wall formed with a socket therein to receive said pin for supporting the closure in open position, said pawl being formed with a projection for guiding said pin as it moves up said front wall into said socket and preventing said pin from returning down said front wall after it has entered said socket by closing with said front wall below said socket, a second projection on said pawl spaced above said first projection and movable into position to prevent said pin from re-entering said socket after it has left said socket and traversed the remainder of said front wall thereby starting said pin down said back wall, and spring means biasing said pawl projections toward said socket.

3. A supporting and releasing means for a hinged closure including a closure mounting bracket construction, a closed slot formed in said mounting bracket construction, a closure supporting strut connected to said closure and having a projection arranged for traverse in said slot, a wall of said slot being formed with a socket adapted to receive said projection, a pawl pivotally supported by said bracket, an arcuate slot formed in said bracket, a dog on said pawl guided in said arcuate slot and limiting the swing of said pawl, and means on said pawl for directing said projection into said socket during opening movement of said closure and preventing forward movement of said projection until said projection has engaged said socket, said pawl being formed with a portion positioned in the path of further upward movement of said projection and movable from said path by engagement with said projection as said projection moves upwardly to the top of said slot whereupon reaching the top of said slot said portion is disengaged from said projection and is returned to its former position and said projection is guided into a different zone of said slot, and spring means normally biasing said pawl portion into the path of upward movement.

WILFRED BRIGHT.

References Cited in the file of this patent

UNITED STATES PATENTS

| Number | Name | Date |
| --- | --- | --- |
| 676,004 | Karpen | June 11, 1901 |
| 1,137,484 | Hays | Apr. 27, 1915 |
| 1,324,094 | Zega | Dec. 9, 1919 |
| 2,076,860 | North | Apr. 13, 1937 |
| 2,188,052 | Lavigne | Jan. 23, 1940 |
| 2,197,648 | Mersheimer | Apr. 16, 1940 |
| 2,206,909 | Lustig | July 9, 1940 |
| 2,392,309 | Burton | Jan. 8, 1946 |